(12) United States Patent  
Berstis

(10) Patent No.: US 6,898,970 B2  
(45) Date of Patent: May 31, 2005

(54) INERTIAL NAVIGATION DEVICE FOR ION PROPULSION DRIVEN SPACECRAFT

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/840,839

(22) Filed: May 7, 2004

(65) Prior Publication Data

US 2004/0244486 A1 Dec. 9, 2004

Related U.S. Application Data

(63) Continuation-in-part of application No. 10/455,158, filed on Jun. 5, 2003, now Pat. No. 6,799,462.

(51) Int. Cl.[7] ............................................. G01P 15/125
(52) U.S. Cl. ................................ 73/382 R; 73/514.17; 73/514.19; 73/514.31; 310/90.5; 33/345
(58) Field of Search ............... 73/570.5, 514.16–514.17, 73/514.19, 514.31, 432.1, 382 R, 643, 652–655; 310/90.5; 33/344–345; 367/185–186; 381/177

(56) References Cited

U.S. PATENT DOCUMENTS

| | | | | |
|---|---|---|---|---|
| 3,626,364 A | * | 12/1971 | Simon et al. ................. 367/185 |
| 3,664,196 A | * | 5/1972 | Codina ..................... 73/514.19 |
| 3,680,393 A | | 8/1972 | Rogall ....................... 73/517 B |
| 3,706,217 A | * | 12/1972 | Slater et al. ................... 73/497 |
| 3,815,963 A | * | 6/1974 | Wilk ........................... 310/90.5 |
| 4,344,235 A | * | 8/1982 | Flanders .................. 33/366.12 |
| 4,430,803 A | * | 2/1984 | Flanders .................. 33/366.14 |
| 4,573,356 A | | 3/1986 | Barmatz et al. ........... 73/570.5 |
| 4,711,125 A | | 12/1987 | Morrison ................... 73/178 R |
| 4,737,774 A | | 4/1988 | Chapman et al. ............ 340/573 |
| 4,901,571 A | * | 2/1990 | Reinhardt et al. ........ 73/514.12 |
| 4,984,463 A | | 1/1991 | Idogaki et al. ............. 73/516 R |
| 5,149,925 A | | 9/1992 | Behr et al. ............ 200/61.45 M |
| 5,159,406 A | | 10/1992 | Adler et al. .................. 356/349 |
| 5,203,209 A | | 4/1993 | Watkins et al. ............. 73/570.5 |
| 5,224,380 A | * | 7/1993 | Paik .............................. 73/510 |
| 5,396,136 A | * | 3/1995 | Pelrine ....................... 310/90.5 |
| 5,922,955 A | | 7/1999 | Brun et al. ............... 73/514.01 |
| 6,465,739 B1 | | 10/2002 | Shepherd et al. ......... 174/125.1 |
| 6,679,118 B1 | * | 1/2004 | Esashi et al. ............. 73/514.32 |

FOREIGN PATENT DOCUMENTS

GB      2211497      7/1989

OTHER PUBLICATIONS

"Diamagnetic Levitation" by Martin Simon, downloaded on May 28, 2003 from http://www.physics.ucla.edu/marty/diamag/index.html, 3 pages.

(Continued)

Primary Examiner—Hezron Williams  
Assistant Examiner—Rose M. Miller  
(74) Attorney, Agent, or Firm—Robert H. Frantz; Mark S. Walker

(57) ABSTRACT

An extremely sensitive accelerometer suitable for use in extreme temperatures such as those encountered during space travel is formed by levitating a magnet in a box or sphere composed of diamagnetic material such as pyrolytic carbon, and a means for measuring the position of the magnet within the enclosure is provided so that over time, the position of the magnet can be monitored. Knowing the mass of the suspended magnet, the displacement over time of the magnetic can be used to calculate acceleration, which can then be used to determine position of a space vehicle.

26 Claims, 14 Drawing Sheets

OTHER PUBLICATIONS

"Technical Note: A High Performance Surface Micromachined Accelerometer for Machine Health and Tactical Inertial Applications" downloaded on Mar. 23, 2004 from http://www.analog.com/Analog_Root/sitePage/mainSect, 2 pages.

"ONI–23505 OEM Digital IMU Module", published by O–Navi, LLC, 2 pages.

"Electric Propulsion System—The Ion Drive", downloaded on Mar. 23, 2004 from http://www.thespacesite.com.

"Xsens Motion Technologies", downloaded on Mar. 23, 2004 from http://www.xsens.com/technology.htm.

"MT9 Inertial 3D Motion Tracker", XSens Motion Technologies, published by Xsens Technologies B.V., 2 pages.

"The Accelerometer Proof Mass Offset Calibration of Grace," Furun Wang, Byron D. Tapley, Srinivas V. Bettadpur, Yanqing Liu, downloaded on Feb. 05, 2004 from ltircw08@STFVM1.vnet.ibm.com.

"Theoretical and Experimental Results of the Mechanical Behavior For a New Optical Accelerometer," F. Viadero, P. Mottier, R. Sancibrian, E. Ollier, A. Fernandez, and F. Encinas, downloaded on Feb. 05, 2004 from ltircw08@STFVM1.vnet.ibm.com.

* cited by examiner

Fig. 1 *Prior Art*

INERTIAL NAVIGATION DEVICE FOR ION PROPULSION DRIVEN SPACECRAFT

CROSS-REFERENCE TO RELATED APPLICATIONS (CLAIMING BENEFIT UNDER 35 U.S.C. 120)

This patent application is a continuation-in-part of U.S. patent application Ser. No. 10/455,158, filed on Jun. 5, 2003, now U.S. Pat. No. 6,799,462 by Viktors Berstis.

INCORPORATION BY REFERENCE

The related U.S. patent application Ser. No. 10/455,158, docket number AUS920030287US1, filed on Jun. 5, 2003, by Viktors Berstis, is hereby incorporated by reference in its entirety.

FEDERALLY SPONSORED RESEARCH AND DEVELOPMENT STATEMENT

This invention was not developed in conjuntion with any Federally sponsored contract.

MICROFICHE APPENDIX

Not applicable.

BACKGROUND OF THE INVENTION

1. Field of the Invention

This invention relates to methods to measure inertia for ion propulsion driven spacecraft.

2. Background of the Invention

This patent application is a continuation-in-part of the U.S. patent application Ser. No. 10/455,158, filed on Jun. 5, 2003, which is pending.

Gravimetric measuring devices are well known in the art, although they are highly specialized and expensive systems. To make a measurement of a gravitational field, a small, well-known mass is typically employed. Because any mechanical support of the mass will also drastically effect or even obscure the relatively weak effects of a gravitational field, typical means of mechanical support of a mass are not useful for gravimetrics.

For example, a typical scale to measure the weight of an item employs a spring to support the item. The mass of the item is estimated by measuring the compression of the spring when the item is suspended or supported by the spring. Variations in gravitational fields from one place to another, however, are so minute that they are immeasurable with even the most sensitive springs as the variations of the spring's force due to temperature, mechanical vibration, etc., are many times larger than the force variations in gravitational fields.

To this end, magnetism, and more specifically repelling magnetic forces, have been employed to suspend small masses for gravimetric measurements. Magnetism can be divided into three types of magnetic behavior: diamagnetism, paramagnetism, and ferromagnetism.

Ferromagnetism is the type of magnetism most commonly employed in modern, daily life. It is the result of naturally aligned intrinsic spin axes of individual electrons of the atoms of the material. Lodestone, iron and magnetite are some of the common materials used to create "permanent magnets", as they exhibit their strong, dipolar magnetic properties under all conditions and temperatures, with or without the presence of other types of fields.

Initially, one who is unacquainted with magnetic theories may suspect that suspension or levitation of a small mass could be achieved using an arrangement of "permanent magnets", or ferromagnets. In 1842, however, Samuel Earnshaw proved his theorem that there is no stable configuration to levitate permanent magnets using static magnetic fields.

Some quasi-stable levitation arrangements have been achieved by spinning the levitated mass, in which gyroscopic moments offset the inherent instability of the forces otherwise exerted on the suspended mass. Unfortunately, the gyroscopic forces are also large enough to offset or obscure the effects of small forces, such as variations in gravitational field, on the suspended mass. Additionally, energy must be induced into the spinning mass to keep it spinning over time, which may also obscure gravimetric measurements.

Diamagnetism may be viewed as an atomic version of Lenz's Law which provides that an electric current resulting from an applied magnetic field will be in a direction which sets up an opposing magnetic field. For example, if a dipole rod magnet (31) is passed or moved v(t) through an electrically conductive ring (30), a current i(t) will be induced in the ring in a direction which sets up a magnetic field (32, 32') which opposes the movement v(t) of the rod magnet, as shown in the related patent invention in FIG. 1. This reactive current and opposing magnetic field is created regardless of the polarity of the inducing magnet.

All known elements are believed to exhibit some degree of diamagnetism. Most elements, however, do not exhibit noticeable or measurable diamagnetic properties. Under cryogenic conditions, such as 77 K, superconductive properties of many elements allow for substantial diamagnetic properties.

Under such cryogenic conditions, Lenz's law can be applied to statically levitate a small magnetic mass above a strong diamagnetic material, taking advantage of the Meisner Effect in which movements of the levitated mass result in a reactive and opposing field to correct for the movements, thereby leaving it in a stable position suspended above the diamagnetic material without any means of mechanical support. For example, FIG. 2, as shown in related patent invention, a small magnetic mass (41), such as a Samarium Cobalt magnet, can be levitated a distance d above a superconductive diamagnetic material (42) such as a ceramic Yttrium compound, which is superconductive at temperatures such as 77 K.

Such a cryogenic, diamagnetic arrangement has been employed by some gravimetric measurement systems, as the force between the levitated mass and the diamagnetic base is highly stable and constant, thereby allowing any differences in displacement between the base and the levitated mass to be attributed to the tiny variations in gravitational field. A laser interferometer may be employed to accurately measure the position of the levitated mass.

This type of gravimetric arrangement, however, is highly dependent on maintaining cryogenic conditions, which implies a need for a considerable supply of coolant such as liquid Nitrogen. Additionally, this type of system is difficult and expensive to operate due to the cryogenesis. Therefore, there existed a need in the art for a system and method for gravimetric measurement which avoids the need for superconductive conditions, materials, and supplies. The related patent application addressed these problems, and disclosed a structure and method of measuring minute changes in gravitational field using a levitated diamagnetic mass which requires operates at room temperature.

Another problem of minute energy measurement arises with respect to navigation requirements for spacecraft. Several organizations, such as the National Aeronautics and Space Administration ("NASA") are investigating alternate methods of rocket propulsion without use of chemicals. Traditional methods of rocket propulsion using chemical reactions are unsuitable for long distance travel as the amount of chemical required to be transported would be prohibitively large.

Traditionally, chemical rocket engines work by combining fuel with an oxidizer. This makes a gas that expands and rushes out the back of the engine, generating the engine's thrust. Chemical engines are "mass-limited" engines. This means that the amount of power a chemical engine develops depends on the amount of fuel and oxidizer the vehicle can carry. When the supply of propellant is exhausted, the vehicle is no longer able to accelerate or maneuver.

An alternative type of propulsion engine under investigation for space vehicle motivation is known as an ion engine. Instead of using a chemical reaction to generate thrust, gaseous Xenon is given an electrical charge, or ionized, and then the ionized Xenon molecules are accelerated to a speed of about 30 km/second using an electromagnetic acceleration mechanism. When the Xenon ions are emitted from the exhaust of the ion engine, they push the spacecraft in the opposite direction, thereby providing a source of thrust without using a chemical reaction.

This type of propulsion means is expected to be highly suitable for long distance space travel, as it only requires a source of electrical energy which is readily converted by solar cells from sun light. Although the force they generate is relatively small when compared to traditional chemical-based rocket engines, when applied over time, ion drives are capable of providing great speed to a vehicle in near frictionless environment of space. As force is directly proportional to acceleration, spacecraft driven with ion propulsion systems will not undergo great amounts of acceleration in short amounts of time. As such, ion-driven spacecraft will require significantly longer amounts of time under much smaller acceleration to reach high velocities of travel. Under appropriate circumstances, however, ion propulsion is expected to be able to drive a spacecraft up to 10 times as fast as traditional chemical propulsion systems, and to dramatically increase the possible duration of space missions.

Navigation of long-range spacecraft, such as explorer craft, is particularly challenging. Compasses are not useful for space navigation, as they depend upon a planetary magnetic field to operate correctly. Global Positioning System ("GPS") navigation depends upon a vehicle traveling within range of 3 or more GPS satellites in geosynchronous orbit about the Earth, which also are not available for spacecraft traveling far from the Earth. Therefore, navigation of such long-range spacecraft is typically performed by making inertial measurements during time, integrating the expected change in position, and using that as an offset from a known starting point.

Inertia navigation systems ("INS") have at the heart of them an Inertial Measurement Unit ("IMU"). In turn, IMU's employ accelerometers to measure acceleration, or changes in velocity, usually in three orthogonal axes. If the mass, initial velocity and initial position of a vehicle are known, and the acceleration of that vehicle is measured over time, a subsequent position of the vehicle can be determined.

Because the thrusts of traditional chemical-based rocket engines is large for a short period of time, IMU's employed in the INS of these vehicles can easily detect and measure acceleration. This is typically done in modern IMU's using accelerometers comprised of specially designed integrated circuits ("IC"). In an accelerator IC, a volume of silicon or other base substrate is etched away from a finger of conductor to create a mass, albeit a small mass, at the end of a cantilever. The amount of mass, and length of the cantilever, determines how much the cantilever will bend in response to the IC being accelerated in a single axis. Three such cantilevers are usually employed to measure acceleration in three axes. The bend of each cantilever is carefully monitored and measured over time, thereby allowing calculation of acceleration, and ultimately determination of a position relative to a starting point.

However, due to the much smaller forces and acceleration characteristics of ion drives, traditional IMU systems are not expected to be sensitive enough to effectively provide for inertial navigation of space vehicles using ion drives. Additionally, cryogenic conditions may exist at some positions in space, but extremely hot conditions can be expected to be encountered by space vehicles as they pass near energy sources such as stars.

For these reasons, there exists a need in the art for an accelerometer sensitive enough to measure extremely small amounts of acceleration, under extremely cold as well as extremely hot operating conditions, without the requirement of any fuel or power source other than electrical energy, such that inertial navigation for ion-driven spacecraft can be achieved.

BRIEF DESCRIPTION OF THE DRAWINGS

The following detailed description when taken in conjunction with the figures presented herein provide a complete disclosure of the invention.

FIG. 9 depicts how mass position shifts when there is acceleration force $F_a$ present.

SUMMARY OF THE INVENTION

An extremely sensitive accelerometer suitable for use in extreme temperatures such as those encountered during space travel is formed by levitating a magnet in a box or sphere composed of diamagnetic material such as pyrolytic carbon, and a means for measuring the position of the magnet within the enclosure is provided so that over time, the position of the magnet can be monitored. Knowing the mass of the suspended magnet, the displacement over time of the magnetic can be used to calculate acceleration, which can then be used to determine position of a space vehicle.

DESCRIPTION OF THE INVENTION

The present invention employs an apparatus and arrangement which is an extension or derivation from the apparatus and arrangement of the invention described in the related patent application. Therefore, it is useful to review the details of the related invention prior to disclosing the present invention.

Ultra-Sensitive Gravimetric Sensing Device

Figure 1:
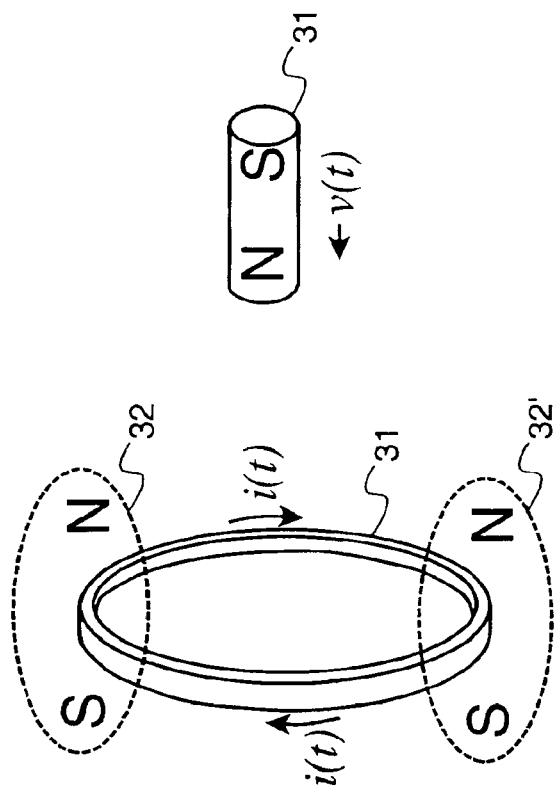
FIG. 1 shows an illustration for understanding of Lenz's law.
Figure 2:
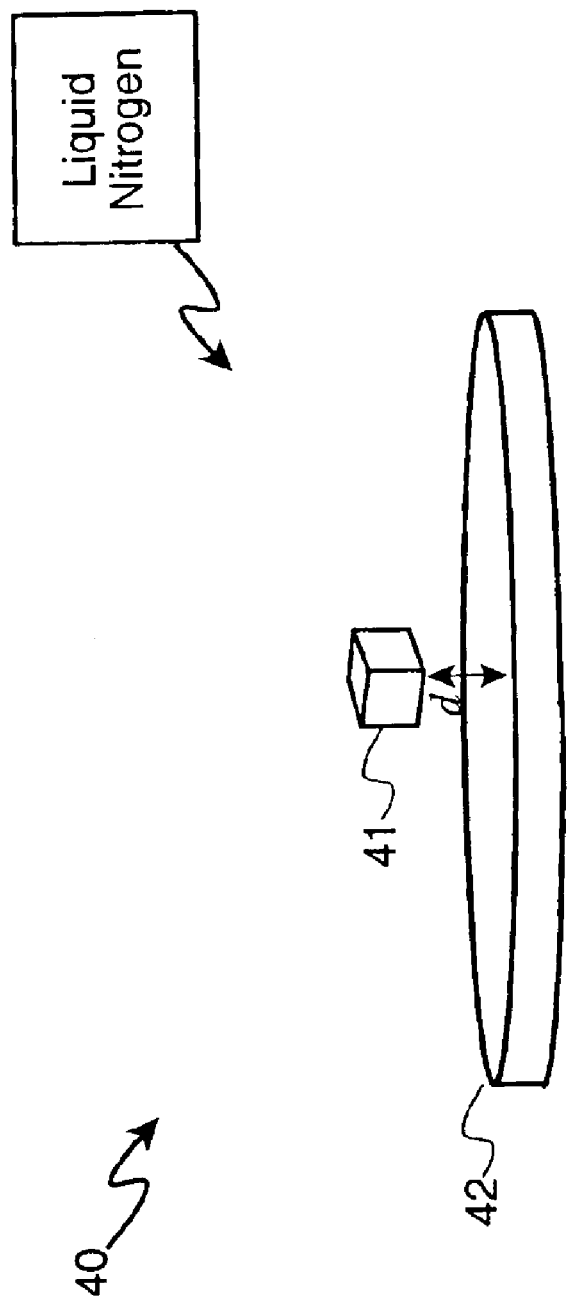
FIG. 2 depicts a levitated mass using diamagnetism at cryogenic temperatures.
Figure 3:
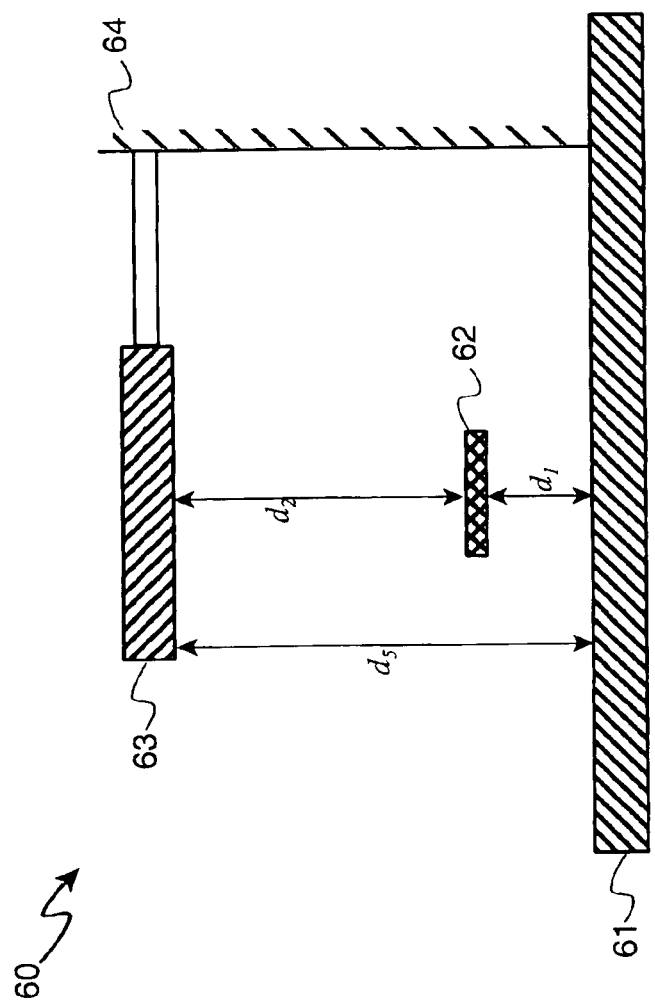
FIG. 3 depicts a known arrangement of permanent magnets and diamagnets which levitates a mass at room temperature.

Turning to FIG. 3, the device described in related patent invention employs a known arrangement (60) comprising a block (61) or base constructed of any suitable form of carbon which exhibits diamagnetic properties, and particularly graphite and pyrolytic graphite. Bismuth is known to have similar diamagnetic properties. Positioned above the block (61) is a permanent magnet of any sort, but preferably of a Neodymium-Boron-Iron compound, because they make the most powerfully permanent magnets known to date.

According to an alternative embodiment of the related invention, a small carbon sheet can be levitated above an arrangement of magnets, in which the diamagnetic mass is the one levitated and the base is comprised of one or more permanent magnets. In either arrangement, the diamagnetic repulsion forces are used to stabilize the configuration at non-cryogenic temperatures.

Further according to the related invention, a second permanent magnet (63) such as a Neodymium-based magnet is statically (64) provided above the base (61) such that the levitation mass (62) is disposed between the top magnet (63) and the base magnet (61). This second permanent magnet (63) is rigidly affixed (64) at a distance $d_5$ from the base (61), and is used to attract the suspended mass (62) upwards and away from the base (61), thereby offsetting most of the actual weight of the suspended mass (62). In this arrangement, the diamagnetic forces are the stabilizing forces, and the attractive forces between the top permanent magnet (63) and the levitated mass provide the bulk of the lifting force.

Although this arrangement (60) is good for experiments and theorem demonstration, it is susceptible to the levitated mass (62) sliding out of a stable position from side-to-side, or being drawn into contact with the top magnet (63) as the result of mechanical vibration or jolting of the configuration.

Figure 4:
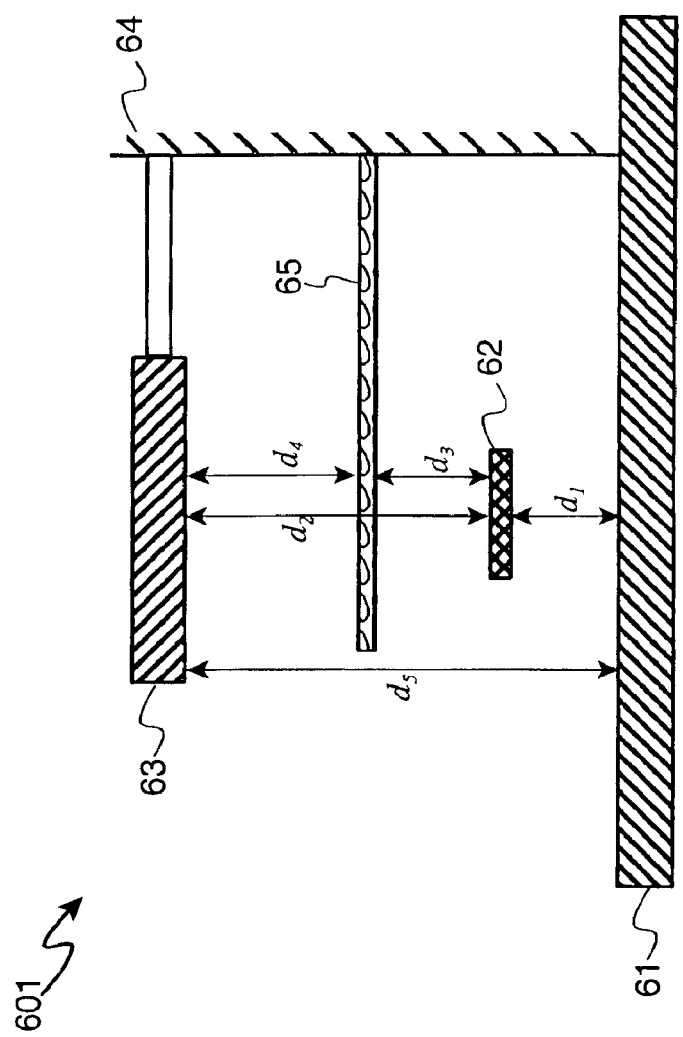
FIG. 4 illustrates a structural configuration according to the related invention in which an upward-travel screen is employed to prevent the levitated mass from being attracted to and contacting with the top magnet.

Turning to FIG. 4, one aspect of the a related invention is illustrated, in which an upper limit screen (65) is placed between the top magnet (63) and the levitated mass (62). As shown in this configuration (601), the top magnet (63) attracts the levitated mass (62) to reduce its weight so that the diamagnetism of the carbon is sufficient to stabilize the levitation. It is desirable to have the top magnet (63) as powerful as possible so that its field lines are as close to parallel as possible in the vicinity of the levitating mass, thereby allowing the size of the region of stable levitation to be maximized. However, if the levitated mass (62) is raised to an increased distance $d_1$ above the base (61), the top magnet (63) will overpower the gravitational force on the mass (62), and will attract the levitated mass to it due to the decreased distance $d_2$, immobilizing the levitated mass.

As such, in our configuration, we have placed a screen (65) comprised of a nonmagnetic, non-shielding and preferrably optically transparent material above the levitated mass (62) and below the top magnet (63) to limit the maximum excursion distance $d_1+d_2$ of the mass (62) from the base (61) (e.g. to set a minimum distance $d_2$ between the mass and the top magnet). This keeps the mass from "flying" to the top magnet when disturbed by vibration or movement. The distances $d_1$, $d_2$, $d_3$, $d_4$, and $d_5$ may be determined empirically or by experiment based upon the mass and strength of the mass to be levitated (62), the strength of the top magnet (63), and the strength of the base material (61).

Figure 5:
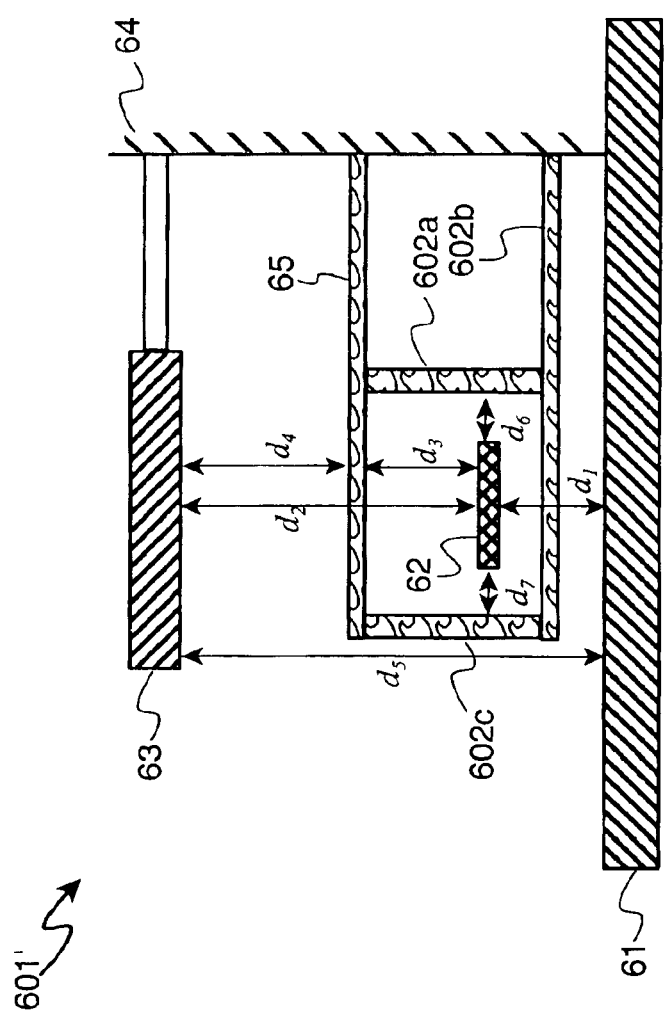
FIG. 5 shows a structural arrangement as described in the related patent application in which the levitated mass is encapsulated in a housing for further excursion limitation, and providing the ability to place the mass in a near or complete vacuum.

Further, according to another aspect of a related invention and as shown in FIG. 5, the levitated mass (62) is encased by a bottom (602b) and two sides (602a, 602c). The sides provide a means to prevent the mass from traveling too far in a side-to-side motion ($d_6$, $d_7$) such that it is maintained in a stable position relative to the base and the top magnet. The bottom (602b) forms an enclosure which around the mass (62) such that a full or partial vacuum may be created within the enclosure, thereby reducing resistance to movement (e.g. increasing sensitivity) of the mass due to gas surrounding the mass, and reducing noise and vibration imparted to the mass by the surrounding gas.

The sides (602a, 602c) and bottom (602b) may optionally be constructed of optically transparent material, and preferrably are nonmagnetic, non-shielding, as well.

The structure and device of FIG. 5 is useful to realize a gravimetric device which operates at temperatures including and beyond cryogenic or superconductive conditions. While there is no reason the device will not work well at cryogenic temperatures, it has also been demonstrated to work well at room temperature.

Figure 6:
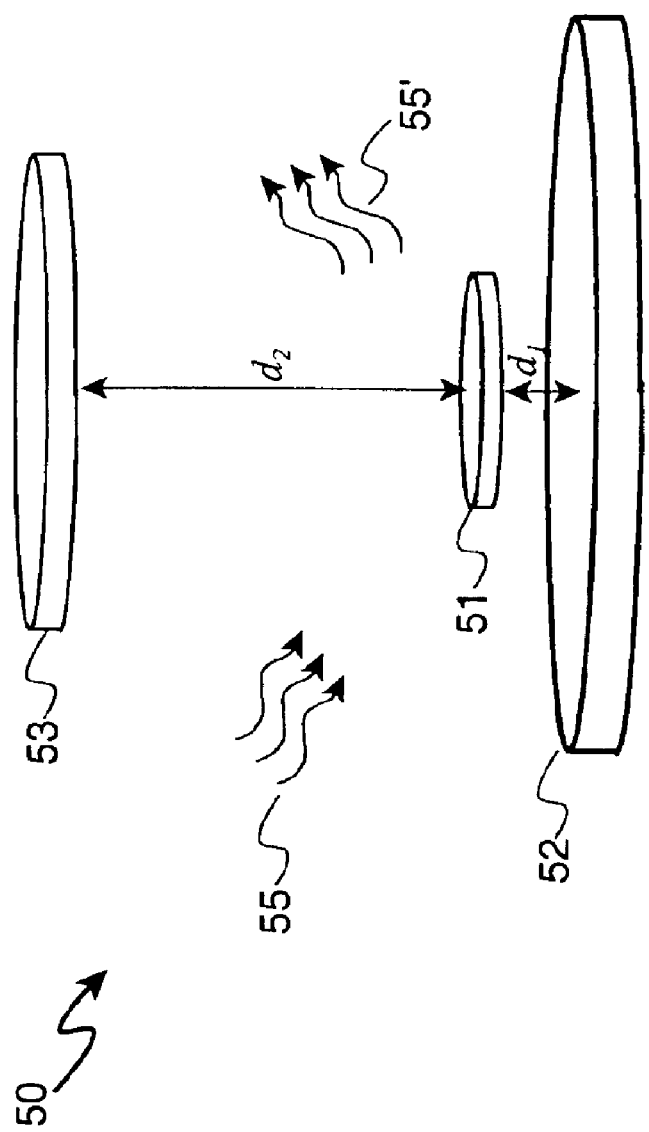
FIG. 6 illustrates a gravimetric measurement device embodiment according to the related invention.

As shown in FIG. 6, the distance $d_1$ between the base (52) and the levitated mass (51) can be measured using a non-intrusive means such as a laser interferometer (55, 55') or capacitance bridge, with the mass (51) suspended between a top magnet (53) which is rigidly affixed with respect to the base (52). A screen and enclosure, previously described but not shown in this figure, are also employed to set a minimum distance $d_2$ achievable between the mass (51) and the top magnet (53) to prevent "fly up", and to prevent sideways excursions of the levitated mass. If a laser interferometer is used for position and deviation measurements, the screen, sides, and bottom of the enclosure should be constructed appropriately of transparent material at the wavelength of the laser.

As gravitational forces placed on the levitated mass (51) will slightly increase or decrease the distance, the displacement $Dd_1$ can be measured by a component such as a laser interferometer. Using the known mass of the levitated magnet (51), the actual strength or change in strength of the gravitational force can be easily determined.

Ultra-Sensitive Inertial Sensor

Turning now to the present invention, having presented the details of the related invention which are useful for understanding the present invention, the conditions under which small amounts of acceleration must be detected and measured for ion-driven spacecraft are different from the conditions of measuring small amounts of gravitational force:

(a) no or nearly no gravitational force is expected due to operating in space, therefore the upper offset magnet of the previous device can be eliminated;

(b) temperature extremes during operation may include extremely cold as well as extremely hot temperatures; and (c) changes in force need to be detected and measured in three orthogonal axes, not just one axis.

Figure 7:
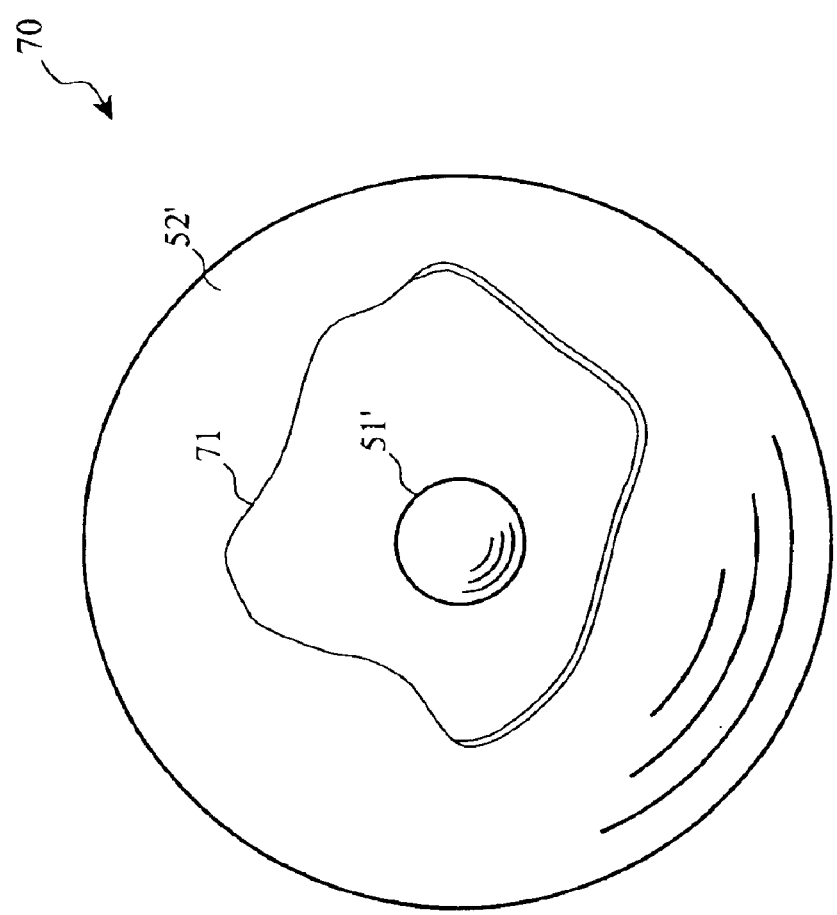
FIG. 7 illustrates an arrangement of permanent magnets and diamagnets which levitates a mass within an outer enclosure according to the present invention.

Turning to FIG. 7, our new arrangement and apparatus to levitate a mass for detection of acceleration in three dimensions is shown. One or both of the outer enclosure (52') and the levitated mass (51'), shown through a hypothetical cut-away (71) in the outer enclosure (52') in this view, are constructed of a diamagnetic material previously discussed.

The outer enclosure (52') is preferably formed in a shape, such as a sphere, which exerts an even amount of magnetic force on the suspended mass (51'), which is also preferably shaped as a sphere. Absent other impending forces (e.g. zero gravity, no acceleration, zero ambient magnetic fields, etc.), the levitated mass (51') is equally repelled or attracted in all directions from or towards the outer enclosure, and as such, it remains suspended in the center of the outer enclosure. Alternate shapes for the enclosure may be employed, such as a regular, uniform, or semi-regular polyhedron (e.g. tetrahedron, cube, octahedron, dodecahedron, icosahedron, truncated cube, cuboctahedron, icoidodecahedron), and other equidecomposable shapes, so long as the mass is provided with a quiescent position within the enclosure having sufficient displacement range to measure an intended amount of acceleration.

However, as the suspended mass (51') can be very small in this arrangement, and the repelling or attraction forces between the mass and the enclosure can be relatively weak, only small amounts of force on the suspended mass (51') will cause it to be displaced from a normal (quiescent) position in the center of the enclosure. This displacement of the suspended mass (51') can be then used as an indication of additional minute force, such as acceleration.

Alternate shapes for the enclosure may be employed, such as a regular, uniform, or semi-regular polyhedron (e.g. tetrahedron, cube, octahedron, dodecahedron, icosahedron, truncated cube, cuboctahedron, icoidodecahedron), and other equidecomposable shapes, so long as the mass is provided with a quiescent position within the enclosure having sufficient displacement range to measure an intended amount of acceleration.

Figure 8:
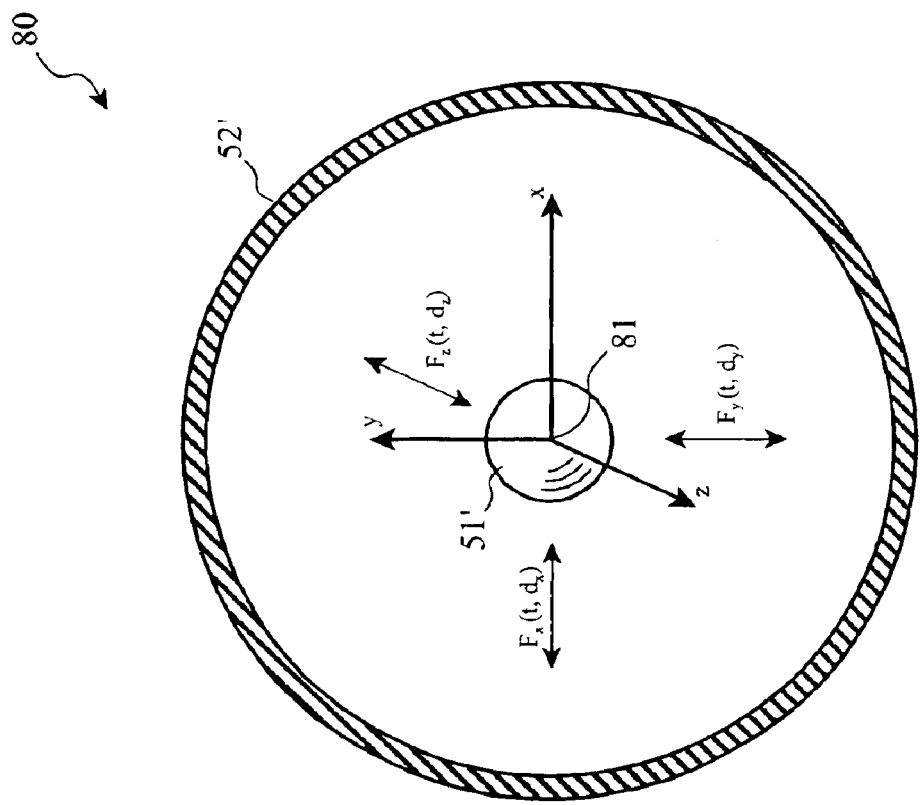
FIGS. 8 and 9 show how three-dimensional displacement of the levitated mass can be observed in relation to acceleration of the apparatus.

Turning to FIG. 8, angular acceleration measurements can be made in two or three dimensions by determining the position at any given time of the suspended mass (51') relative to a quiescent point ("Q-point") (81). The Q-point is the position the suspended mass (51') assumes when the arrangement (80) is at rest with no other forces impending on it.

Figure 9:
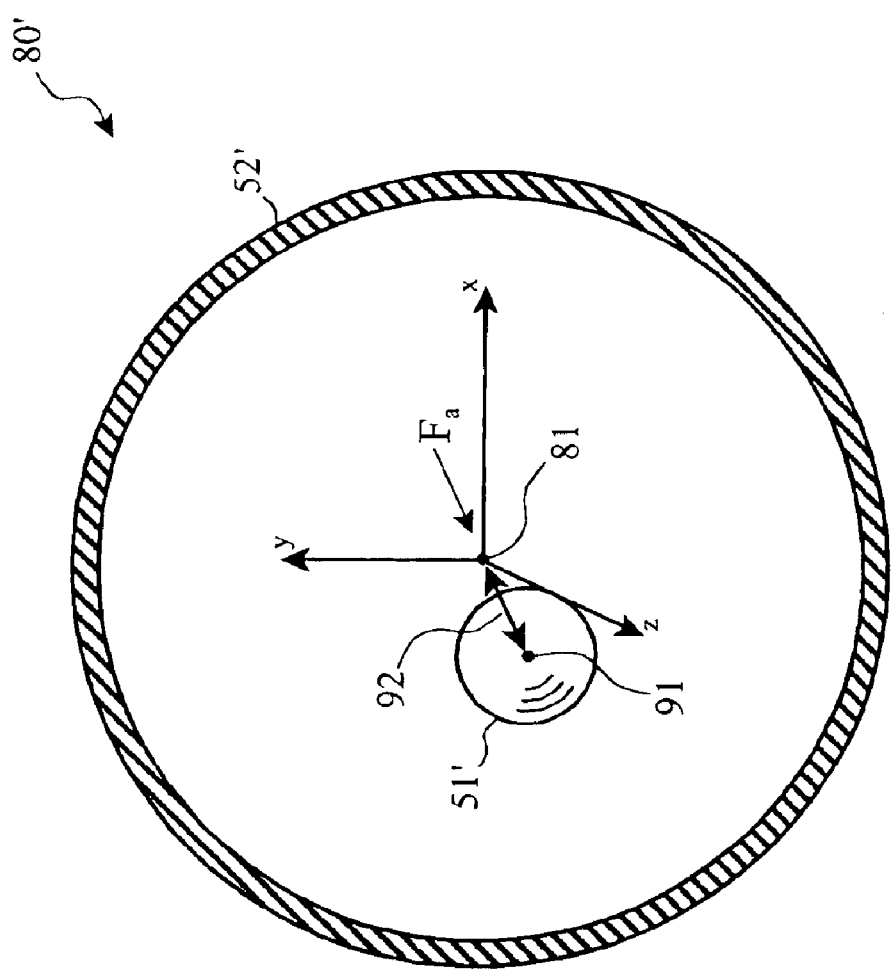

In this figure, we have illustrated three orthogonally related axes (x, y, and z) centered upon the origin or Q-point (81). When acceleration of the apparatus occurs in space (e.g. under no or negligible ambient gravitation and magnetic forces), the suspended mass (51') will be displaced temporarily from the Q-point in the opposite direction of the direction of acceleration. This displacement can be resolved into three vector components, and using the known mass of the suspended mass (51') and the formula:

$$F = m \cdot a \quad \text{Eq. 1}$$

wherein force equals mass times acceleration, displacement (92) of the suspended mass (51') due to the force of acceleration $F_a$, resolved into three vector component forces $F_x(t, d_x)$, $F_y(t, d_y)$, and $F_z(t, d_z)$, is used to determine three vector time-dependent components of acceleration $A_x(t, d_x)$, $A_y(t, d_y)$, and $A_z(t, d_z)$, as further illustrated in FIG. 9.

Figure 10:
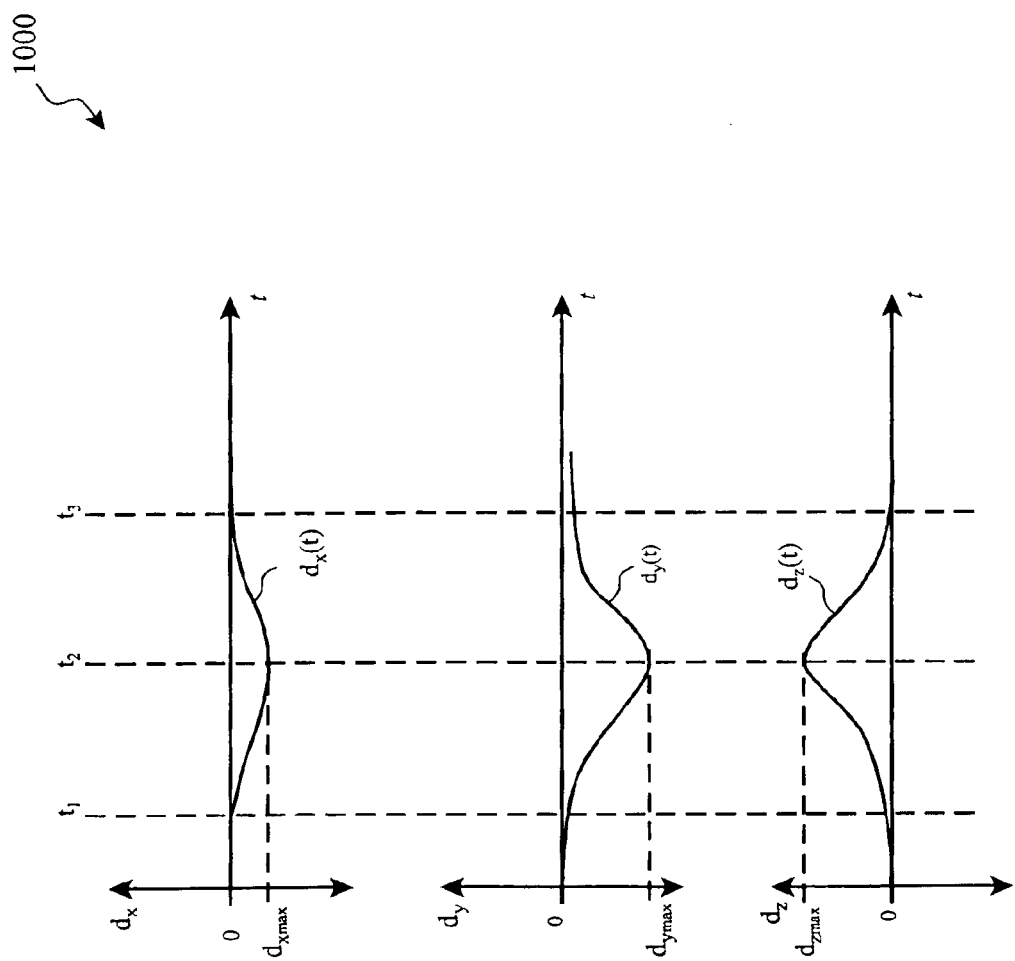
FIG. 10 provides a three-dimensional displacement plot of a hypothetical acceleration profile.

When acceleration of the apparatus is discontinued, such as when a space vehicle reaches a desired or target velocity, the suspended mass (51') will return to its Q-point until additional acceleration (or deceleration) occurs, as shown in FIG. 10. Three plots (1000) of a hypothetical acceleration profile are shown, each representing a single axis of acceleration or vector component. At $t_1$, acceleration begins, which results in a negative displacement in the x and y axes, $d_x(t)$ and $d_y(t)$, and a positive displacement in the z axis, $d_z(t)$, over time t are plotted.

At time $t_2$, acceleration reaches a peak value (e.g. the vehicle or apparatus reaches a stable velocity), and a maximum displacement of the suspended mass (51') in each axis $d_{x\ max}$, $d_{y\ max}$, and $d_{z\ max}$, is exhibited, followed by a return to the Q-point at $t_3$. In practice, any combination of negative and positive components of displacement can be measured, including other profiles and maximum displacement values up to the point of the suspended mass (51') coming into contact with the outer enclosure (52') (e.g. wherein the magnitude of displacement is the inside radius of the spherical outer enclosure).

Figure 11:
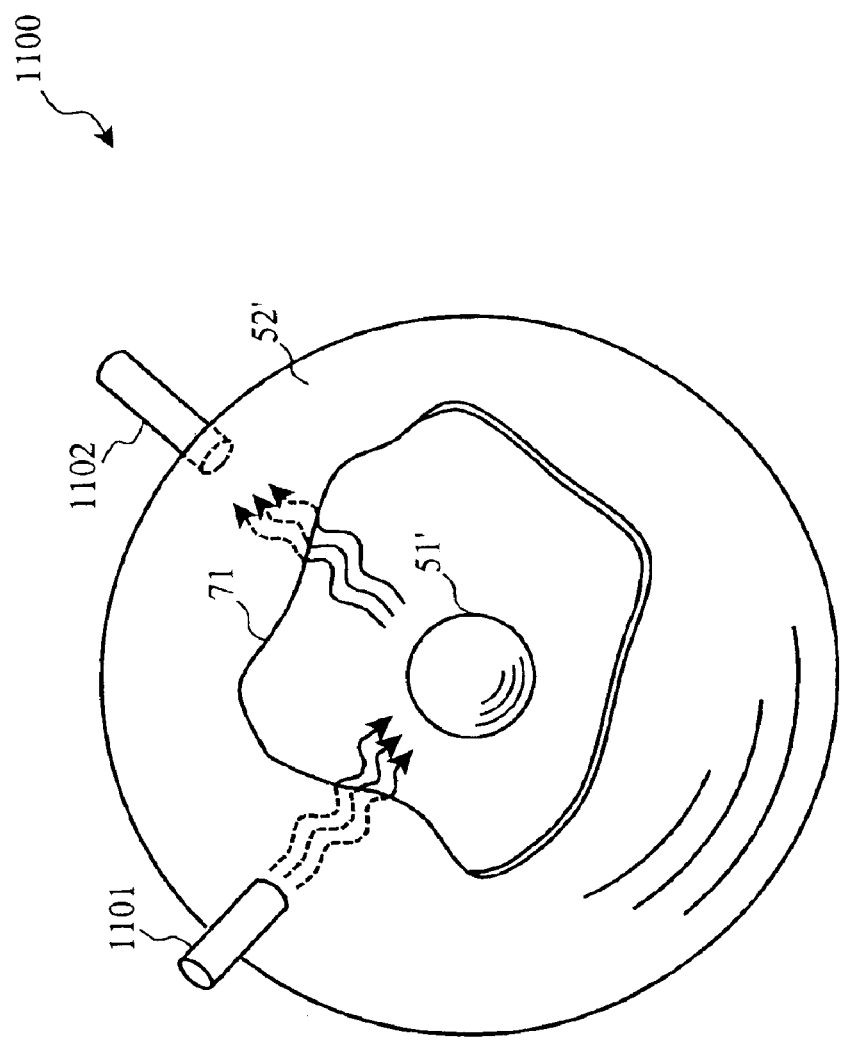
FIGS. 11 and 12 illustrate an arrangement for observing displacement of the suspended mass over time.
Figure 12:
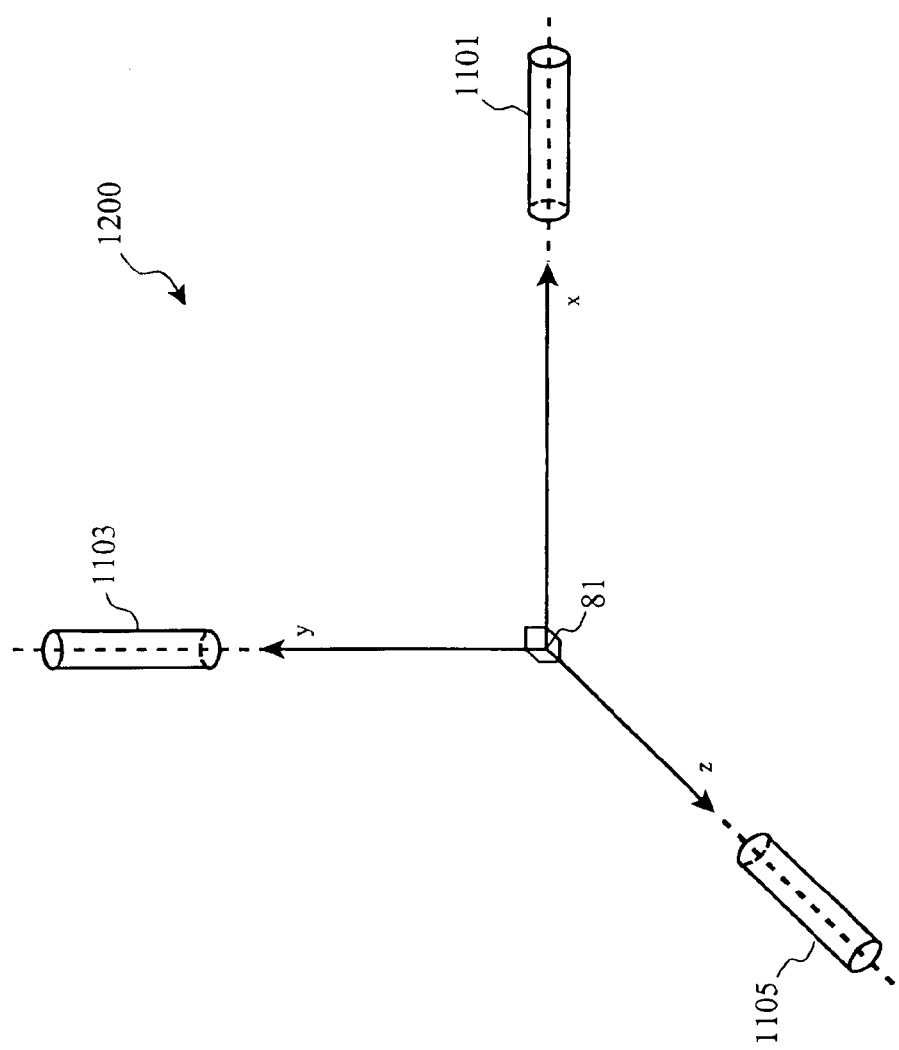

The direction and distance of displacement of the levitated mass (51') can be detected using a non-intrusive means, such as a laser interferometer, in an arrangement (1100) wherein an emitter (1101) and one or more corresponding sensors (1102) are provided with a small portals through the outer enclosure (52') such that movement of the levitated mass (51') can be measured in a manner similar to the method employed in the related invention. FIG. 11 shows an emitter-sensor set (1101, 1102) for a single axis of displacement measurement for better illustration of the invention. In practice, three emitters (1101, 1103, 1105), preferably arranged along orthogonal axes relative to each other, as shown (1200) in FIG. 12, are provided along with corresponding sensors (1102, 1104, 1106) (not shown). According to one preferred embodiment, the emitters are lasers with defractors, and the sensors are arrays of optical sensors. Alternate non-intrusive measurement technologies may be employed, as well, such as use of Hall-effect sensors without specific discrete emitters as the magnetic mass emits its own magnetic field, or a laser interferometer.

Figure 13:
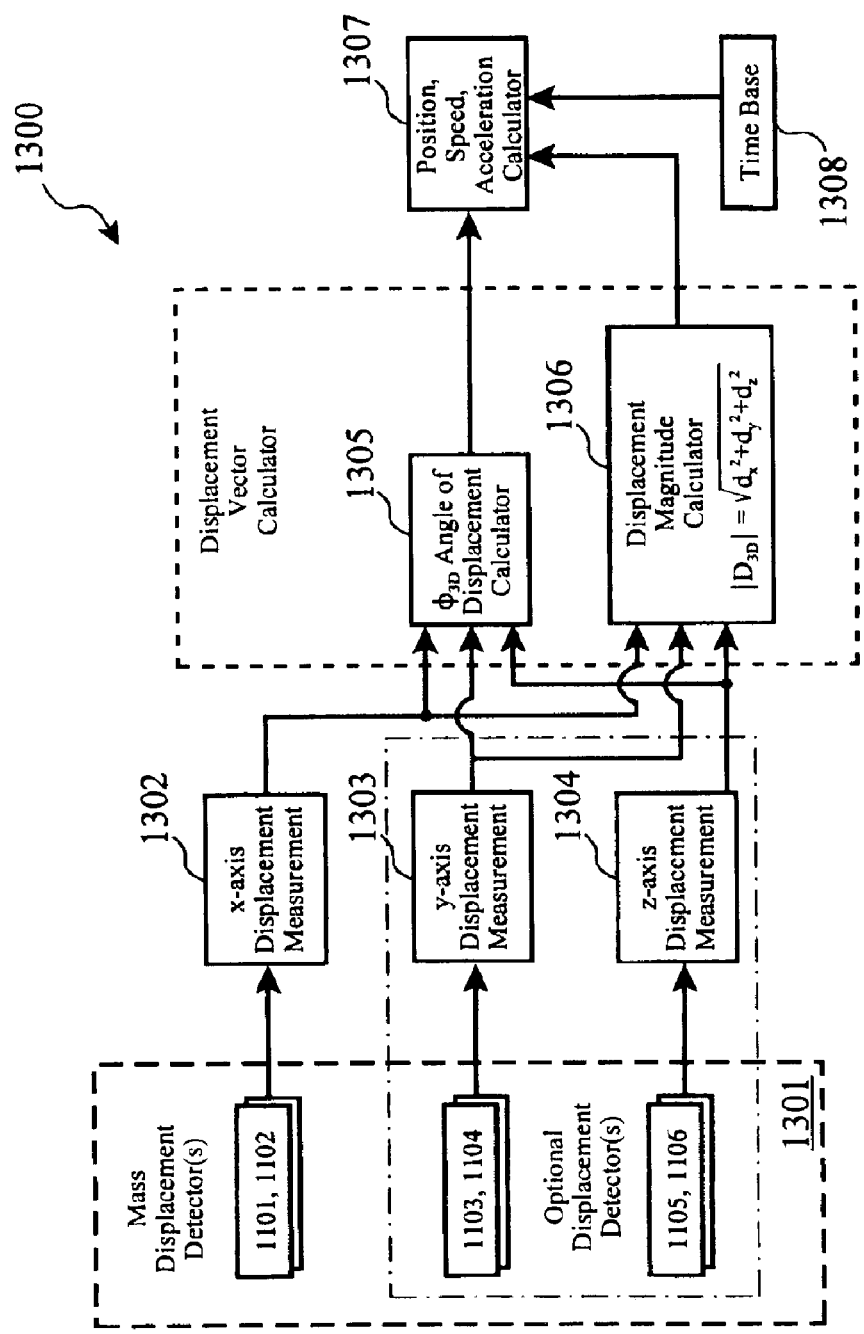
FIG. 13 shows a system diagram for use of our new apparatus in an ultra-sensitive inertial navigation unit.

A system diagram (1300) according to the invention for inertial navigation using our new apparatus is shown in FIG. 13. Readings from each of the orthogonal displacement detectors (1301) are measured (1302, 1303, and 1304). The instantaneous magnitude of displacement $|D_{3d}|$ can be calculated (1306) by taking the square root of the squares of the instantaneous magnitudes of the component displacement values $d_x$, $d_y$ and $d_z$. Further, an angle of displacement $\phi_{3d}$ can be determined (1305) using inverse trigonometry, such as $\phi_{z-x} = \arctan(d_z/d_x)$, $\phi_{y-x} = \arctan(d_y/d_x)$, and $\phi_{z-y} = \arctan(d_z/d_y)$. As such, $|D_{3d}| < (\phi_{z-x}, \phi_{y-x}, \phi_{z-y})$ represents a vector of displacement from the origin in polar coordinates.

These instantaneous displacement measurements can, with knowledge of a time base (1308) and a vehicle mass, be used to calculated acceleration, and ultimately speed and position, relative to an initial speed and initial position, in manners similar to the calculations employed in present INS systems.

Figure 14:
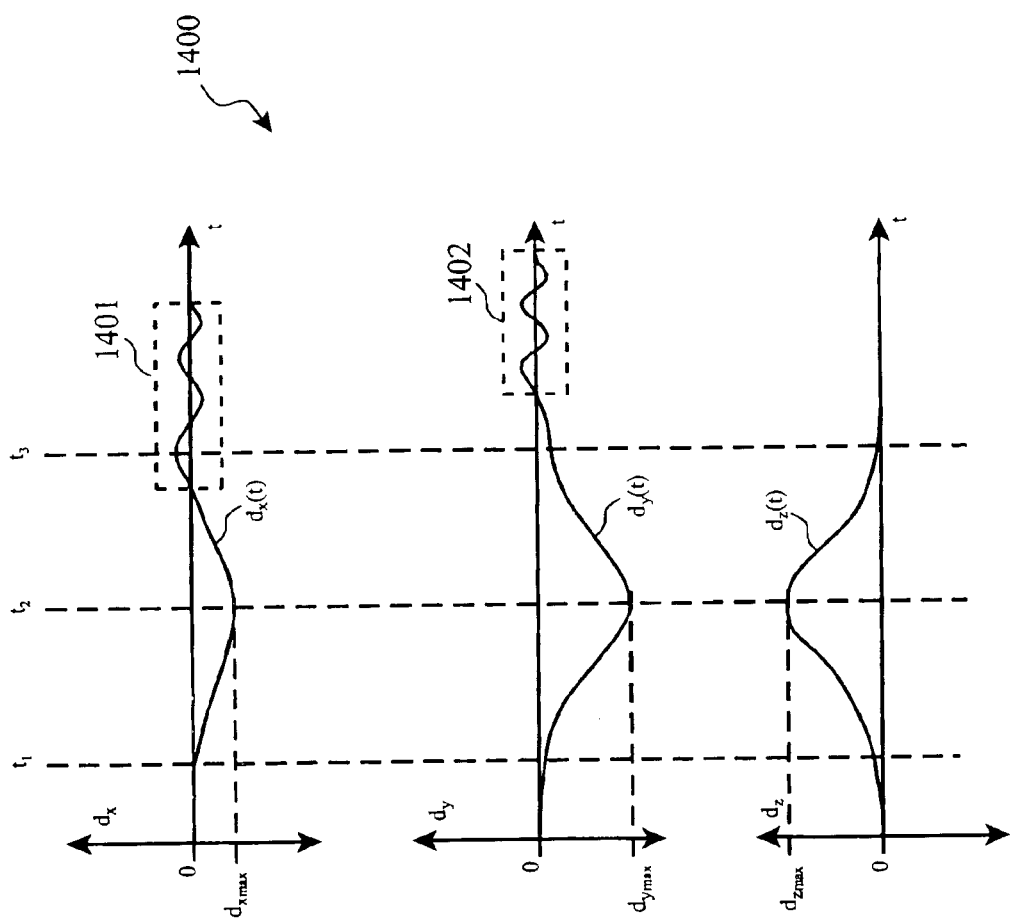
FIG. 14 illustrates underdamping effects possible in practice.

Finally, turning to FIG. 14, in practice, ringing or oscillation (1401, 1402) of the arrangement (51', 52') is possible if the diametric repulsion or attractive forces are too light (e.g. causing underdamping of the suspended mass) in comparison to the mass of the suspended mass (52'). Overdamping (not illustrated) may occur if diametric forces are too great, as well. These types of real-world mechanical phenomena, however, are encountered in most control systems, and as such, known filtering techniques can be applied to remove the effects of such underdamping or overdamping from x-, y- and z-axis displacement measurements prior to calculating the actual displacement and calculation of acceleration, velocity and position.

It will be recognized by those skilled in the art that the method and structures disclosed here are illustrative of the invention, and that many variations, alternate embodiments and substitutions for the disclosed elements, structures and materials may be made without departing from the spirit and scope of the present invention. Therefore, the scope of the present invention should be determined by the following claims.

What is claimed is:

1. An apparatus for measurement of acceleration and changes in inertia in a low-gravity, low-magnetic field environment, comprising:
    an enclosure defining a cavity, said enclosure being comprised of a diamagnetic material;
    a mass disposed in said cavity such that it is subject to diamagnetic forces from said enclosure, said mass being comprised of a magnetic material and assuming a quiescent position when not undergoing acceleration or changes in inertia;
    a first mass displacement detector configured to detect movement of said mass from said quiescent position during periods of acceleration or changes in inertia, said mass displacement detector outputting a first axis displacement measurement relative to the instantaneous amount of displacement of the mass along a first axis;
    a displacement calculator configured to receive said first axis displacement measurement, to determine a magnitude of displacement in said first axis based upon a known mass value of said mass, and to output said magnitude of displacement value;
    a time reference; and
    a position, speed and acceleration calculator configured to determine a net displacement of a vehicle with reference to an initial velocity and initial position based upon said magnitude of displacement value and a time value from said time reference.

2. The apparatus as set forth in claim 1 wherein said diamagnetic material is selected from the group of diamagnetic carbon, graphic, pyrolytic graphite, and Bismuth.

3. The apparatus as set forth in claim 1 wherein said enclosure is approximately equidecomposable in shape.

4. The apparatus as set forth in claim 3 wherein said enclosure is approximately spherical in shape.

5. The apparatus as set forth in claim 1 wherein said mass displacement detector comprises a laser emitter fitted with a defractor, and one or more sensors adapted to detect impending light of the frequency emitted by said laser emitter.

6. The apparatus as set forth in claim 1 wherein said mass displacement detector comprises at least one Hall-effect sensor.

7. The apparatus as set forth in claim 1 wherein said mass displacement detector comprises a laser interferometer.

8. The apparatus as set forth in claim 1 further comprising at least one additional mass displacement detector each of which is configured to measure displacement of said mass along an additional axis independent from said first axis, and to output an additional axis displacement measurement relative to the instantaneous amount of displacement of the mass along said additional axis.

9. The apparatus as set forth in claim 8 wherein said first axis and said one or more additional axes are orthogonally related to each other.

10. The apparatus as set forth in claim 8 wherein said displacement calculator is configured to determine an additional displacement magnitude value for each of said additional axes, and wherein said magnitude of displacement value output is configured to output multi-dimensional displacement vectors.

11. The apparatus as set forth in claim 10 wherein said first and said additional axes are orthogonally related to each other.

12. The apparatus as set forth in claim 10 wherein said output is configured to output said displacement vectors in a rectangular vector format.

13. The apparatus as set forth in claim 10 wherein said output is configured to output said displacement vectors in a polar representation.

14. An apparatus for measurement of acceleration and changes in inertia in a low-gravity, low-magnetic field environment, comprising:
    an enclosure defining a cavity, said enclosure being comprised of a magnetic material;
    a mass having disposed in said cavity such that it is subject to magnetic forces from said enclosure, said mass being comprised of a diamagnetic material and assuming a quiescent position when not undergoing acceleration or changes in inertia;
    a first mass displacement detector configured to detect movement of said mass from said quiescent position during periods of acceleration or changes in inertia, said mass displacement detector outputting a first axis displacement measurement relative to the instantaneous amount of displacement of the mass along a first axis;
    a displacement calculator configured to receive said first axis displacement measurement, to determine a magnitude of displacement in said first axis based upon a known mass value of said mass, and to output said magnitude of displacement value;
    a time reference; and
    a position, speed and acceleration calculator configured to determine a net displacement of a vehicle with reference to an initial velocity and initial position based upon said magnitude of displacement value and a time value from said time reference.

15. The apparatus as set forth in claim 14 wherein said diamagnetic material is selected from the group of diamagnetic carbon, graphic, pyrolytic graphite, and Bismuth.

16. The apparatus as set forth in claim 14 wherein said enclosure is approximately equidecomposable in shape.

17. The apparatus as set forth in claim 16 wherein said enclosure is approximately spherical in shape.

18. The apparatus as set forth in claim 14 wherein said mass displacement detector comprises a laser emitter fitted with a defractor, and one or more sensors adapted to detect impending light of the frequency emitted by said laser emitter.

19. The apparatus as set forth in claim 14 wherein said mass displacement detector comprises at least one Hall-effect sensor.

20. The apparatus as set forth in claim 14 wherein said mass displacement detector comprises a laser interferometer.

21. The apparatus as set forth in claim 14 further comprising at least one additional mass displacement detector each of which is configured to measure displacement of said mass along an additional axis independent from said first axis, and to output an additional axis displacement measurement relative to the instantaneous amount of displacement of the mass along said additional axis.

22. The apparatus as set forth in claim 21 wherein said first axis and said one or more additional axes are orthogonally related to each other.

23. The apparatus as set forth in claim 21 wherein said displacement calculator is configured to determine an additional displacement magnitude value for each of said additional axes, and wherein said magnitude of displacement value output is configured to output multi-dimensional displacement vectors.

24. The apparatus as set forth in claim 23 wherein said first and said additional axes are orthogonally related to each other.

25. The apparatus as set forth in claim 23 wherein said output is configured to output said displacement vectors in a rectangular vector format.

26. The apparatus as set forth in claim 23 wherein said output is configured to output said displacement vectors in a polar representation.

* * * * *